United States Patent [19]

Van Dongen

[11] Patent Number: 5,081,919
[45] Date of Patent: Jan. 21, 1992

[54] CONE-SHAPED APPARATUS FOR TEMPERING BOILED CANDY

[75] Inventor: David B. Van Dongen, Hackettstown, N.J.

[73] Assignee: Warner-Lambert Company, Morris Plains, N.J.

[21] Appl. No.: 373,756

[22] Filed: Jun. 29, 1989

[51] Int. Cl.$^5$ ............................ A23G 3/08; B29B 7/52
[52] U.S. Cl. ...................................... 99/483; 99/353; 425/365; 425/367
[58] Field of Search .............. 99/483, 353, 355, 450.1, 99/450.7; 366/74, 76, 77, 93, 69, 145, 144, 221, 231, 230, 149; 426/524; 425/200, 365, 367, 426; 165/90

[56] References Cited

U.S. PATENT DOCUMENTS

| | | | |
|---|---|---|---|
| 498,142 | 5/1893 | Thoens | 99/450.1 |
| 794,376 | 7/1905 | Nazel | 366/74 |
| 831,812 | 9/1906 | Weber | 165/90 |
| 1,207,143 | 12/1916 | DeFrancisci | 366/74 |
| 1,341,743 | 6/1920 | Hanauer | 366/231 |
| 3,063,391 | 11/1962 | Johnston et al. | 425/96 |
| 3,118,395 | 1/1964 | Steels et al. | 99/353 |
| 4,590,851 | 5/1986 | Mayer | 366/144 X |
| 4,590,852 | 5/1986 | Mayer et al. | 366/144 X |

FOREIGN PATENT DOCUMENTS

| | | | |
|---|---|---|---|
| 45822 | 6/1962 | Poland | 366/144 |

Primary Examiner—Harvey C. Hornsby
Assistant Examiner—Scott J. Haugland
Attorney, Agent, or Firm—Daniel A. Scola, Jr.; Richard S. Bullitt

[57] ABSTRACT

A candy tempering apparatus for tempering a mass of hard candy material to a desired consistency comprises an inverted, truncated cone having an open top, an open bottom, and an inner surface having an upper rim portion. The cone is rotatable about its longitudinal axis and a feeder deposits molten candy material onto the upper rim. Fixedly positioned coaxially in the cone is a stator having adjustable arms carrying plows and rollers for advancing the candy material from the upper rim down the inner surface of the rotating cone and out through the open bottom. Also included are means for adjusting the speed of rotation, and the lateral positioning of the adjustable rollers and plows with respect to the inner surface of the cone, for kneading the candy material to a desired consistency. The cone may have a variable angle of inclination to accommodate the change in consistency of the candy as it cools, so that the cone is steeper toward the bottom of the cone. To help maintain desired consistency and adjust the degree of cooling to maintain a constant temperature for tempering the candy, there is included a temperature probe and sensor which may be controllably connected to a network of fluid spray heads about the outside of the cone, as well as to an air blower positioned over the open top of the cone, for controllably cooling the candy material.

8 Claims, 1 Drawing Sheet

CONE-SHAPED APPARATUS FOR TEMPERING BOILED CANDY

FIELD OF THE INVENTION

This invention relates generally to the manufacture of hard candy. More specifically, this invention relates to a cone-shaped apparatus for tempering a molten mass of hard boiled candy material. The present invention is particularly, though not exclusively, useful for tempering the candy to a desired consistency, texture, and hardness during the process of manufacturing the hard candy.

BACKGROUND OF THE INVENTION

The manufacture of hard candy has progressed through the years with the utilization of automated candy manufacturing processes. In such manufacturing processes, large amounts of candy are conveyed through a process designed for maintaining a high production rate. Hard candy is typically initially produced in the form of a molten mass of sucrose and corn syrup solids. The molten mass of material must be tempered and cooled at a controlled rate with a minimum amount of handling to prevent the sugar from crystallizing. Traditional methods utilized in the manufacturing process for hard candy use a conventional belt cooler. The belt cooler has a belt which conveys the molten candy mass at a fixed speed past rollers and plows. The rollers and plows turn and knead the candy mass, as it cools in its travel along the conveyor belt. The conVentional belt cooler is usually Very long in order to allow sufficient, time for tempering, i.e. cooling and kneading, and thus occupies a great deal of valuable floor space in a factory.

Thus, the present invention recognizes the need for a device or apparatus for tempering boiled candy that is more compact and therefore requires less floor space than conventional belt coolers. The present invention further recognizes the need for providing an apparatus which is readily adaptable to the various candy formulations having different material properties, and thus differing requirements for rates of cooling and amounts of kneading and blending required to obtain the desired consistency and texture of the hard candy. The present invention also recognizes the need for providing a device having the required total surface area for the candy which is equivalent to that of a belt cooler, yet allows the flexibility for tempering the molten mass of hard boiled candy in an efficacious manner.

Accordingly, it is an object of the present invention to provide an apparatus and method for tempering a molten mass of hard boiled candy material which is more compact and requires less floor space than conventional belt coolers. It is a further object of the present invention to provide a candy tempering apparatus which tempers the candy at a controlled rate with a minimum amount of undesired handling to prevent the e sugar in the candy from crystallizing. It is a further object of the present invention to provide a method and apparatus for tempering molten hard candy which is readily adaptable and adjustable to a wide range of candy formulations having differing material properties. Another object of the present invention is to provide a method and apparatus for tempering hard candy which is cost effective, and readily adaptable to existing conventional candy manufacturing facilities and processes.

SUMMARY OF THE INVENTION

A preferred embodiment of the apparatus for tempering a molten mass of hard boiled candy material comprises an inverted truncated cone having an open top, an open bottom, an inner surface, and an outer surface. A mechanism is coupled to the cone for rotating the cone about its longitudinal axis, and a feeder operates to feed molten candy material into an upper rim portion of the inner surface of the cone. Advancing mechanisms are attached to a fixed stator coaxially positioned inside the cone for advancing the molten candy material from the upper rim, down the inner surface, and out through the open bottom of the cone. The advancing mechanism includes adjustable rollers and plows connected to the stator for accommodating different sizes of molten candy material. The cone is rotatable at either a fixed speed or a variable speed of rotation. In addition, the inner surface of the cone may have a paraboloid portion where the angle of inclination of the surface varies and becomes steeper toward the bottom of the cone to account for the change in material properties of the candy as it cools and the viscosity increases to a plastic-like consistency.

In addition, the present invention provides spraying of fluid on the outer surface of the cone for cooling the cone surface, and also an air blower for blowing air onto the candy mass as it moves down the inner surface of the cone. A temperature monitoring device is included for monitoring the temperature of the candy material as it exits out of the bottom of the cone for adjustably controlling the degree of cooling by the cooling mechanisms for maintaining a constant temperature. Also included is a method for accomplishing the same.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
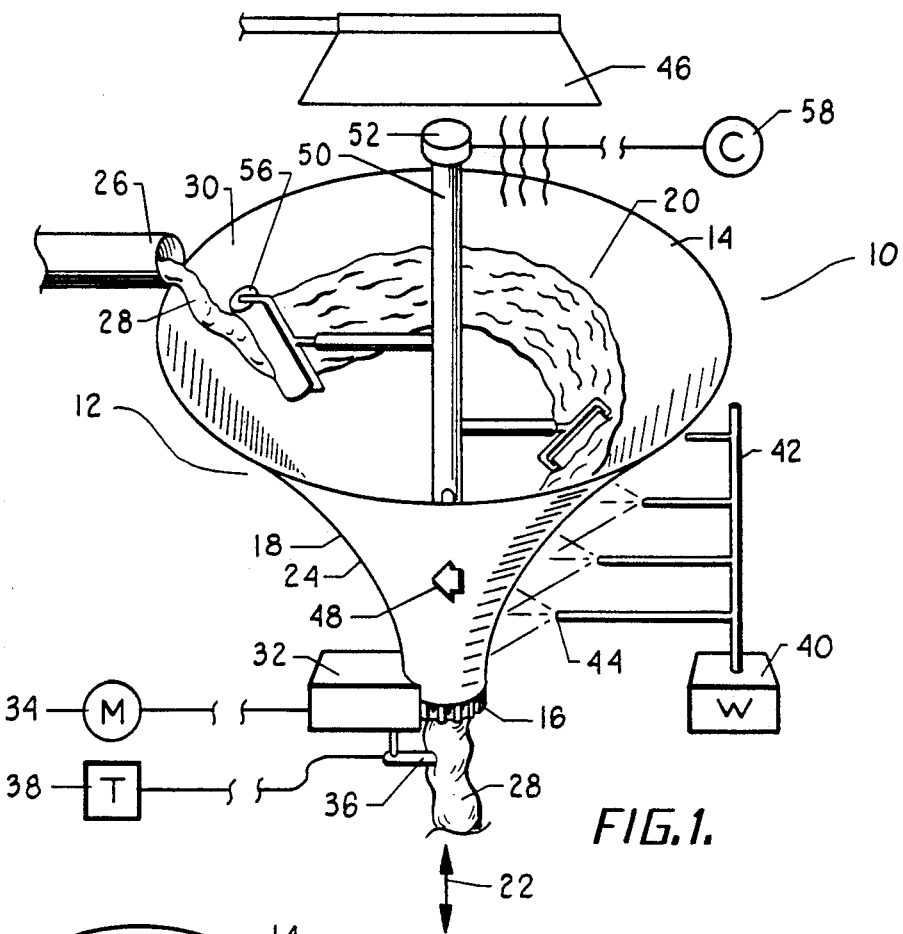
FIG. 1 is a perspective front view of the candy tempering apparatus in accordance with the present invention in its intended environment.

FIG. 1 shows a candy tempering apparatus generally designated as 10 in its intended environment in accordance with the present invention. The candy tempering apparatus 10 comprises an inverted, truncated hollow cone 12 having an open top 14 and an open bottom 16. The cone 12 has an outer surface 18 and an inner surface 20. The slope of the inner surface 20 is generally straight at an incline to the vertical longitudinal axis of the cone. As more fully described below, in the preferred embodiment, the angle of inclination of the inner surface 20 of the cone is steeper near the open bottom 16 of the cone to form a paraboloid portion 24 as will be more fully explained below.

Further, with respect to FIG. 1, there is shown a feeder 26 for feeding a molten mass of hard candy material 28 into an upper rim 30 on the inner surface 20 at the top 14 of cone 12. The candy material 28 is typically a molten mass of sucrose and corn syrup solids, which must then be cooled and tempered at a controlled rate with a minimum amount of handling to prevent the sugar from crystallizing during the hard candy manufacturing process.

Connected to the cone 12 is a known drive mechanism 32 for rotating the cone 12 about its longitudinal axis 22 via a motor 34. Motor 34 is a variable speed motor which can be set at a fixed speed, or can be varied to the desired speed of rotation of the cone. Connected to the drive mechanism 32 is a temperature sensor 36 for monitoring the temperature of the candy material 28 as it exits the open bottom 16 of the cone 12. The temperature sensor 36 sends a signal to a temperature feedback control mechanism 38, such as a microcomputer, which indicates the temperature and generates appropriate control signals in response to the temperature measured by temperature sensor 36.

Positioned around the outside of cone 12 are one or more fluid spray cooling devices 40 having a network of fluid lines 42 connected to fluid spray heads 44. Spray heads 44 are positioned at desired points for spraying the outer surface 18 of the rotating cone 12 with cooling fluid, such as water, for controllably cooling the outer portion of the cone. Although the embodiment shown has only one set of heads, there may be multiple sets of heads 44 distributed at points as desired about the outer surface 18 of the cone 12.

Also included is a blower 46 positioned above the open top 14 of the cone 12 for blowing air directly onto the candy material 28 as it moves down the inner surface 20 of the cone 12. The cooperation of the cooling components described above will become more apparent and better appreciated in the description which follows further.

Also shown is a stator 50 generally in the form of a cylindrical pipe fixedly positioned coaxially with the cone, and mounted to a kneading adjustment mechanism 52 which is fixed in position with respect to rotating cone 12. Extending radially at various points from the sides of the stator 50 are a series of adjustable extendable arms 54. Each arm 54 has kneading elements 56, such as rollers, plows or other similar material handling members attached thereto. The arms 54 extend a sufficient distance toward the inner surface 20 of the cone to knead the candy material 28 as it is carried by the rotating cone 12 in its path down the inner surface 20, to exit through the open bottom 16 onto the next conveyor belt or other step of the candy manufacturing process. The adjustable arms 54 are controlled by the adjustment mechanism 52 according to the controls of a controller 58, such as a microcomputer, for accommodating the shape of the inner surface 20 and the size of the molten mass of candy material which is being fed into the candy tempering apparatus 10. Although only rollers are shown in the present embodiment as the kneading elements, plows or other shapes are readily adaptable to be connected thereto and are contemplated within the scope of the present invention.

Figure 2:
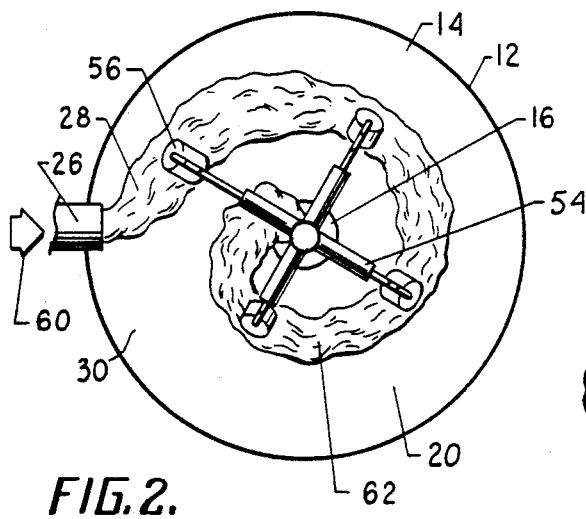
FIG. 2 is a top view of a portion of the apparatus.
Figure 3:
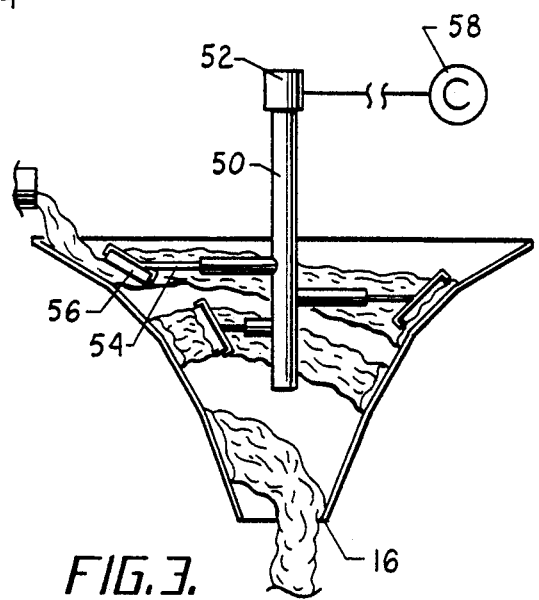
FIG. 3 is a cross-sectional side view of a portion of the apparatus in accordance with the present invention.

The operation of the present invention can be further appreciated by reference now to FIGS. 2 and 3. FIG. 2 illustrates the molten candy material 28 being fed generally in the direction of arrow 60 from the feeder 26 into the upper rim 30 of the top 14 of cone 12. The cone 12 is rotated by the rotating mechanism 32 at an appropriate speed generally in the direction indicated by arrow 48. As the cone rotates, and as the molten candy material 28 is being fed into the cone, the candy material is carried on the inner surface 20 of the rotating cone 12 and moves by gravity down the inner surface 20 so as to form a spiral or helical shape 62. The adjustable arms 54 are adjusted by the adjustment mechanism 52 and controller 58 to extend the appropriate distance to assure that the candy material is kneaded to the proper consistency as required.

In the process of rotating the cone 12, the material cools by virtue of the fact it has left the feeder 26 and is exposed to room temperature. It may readily be seen that depending on the speed of the cone, there may be a much tighter wrapping of spirals than that shown in FIG. 2 so as to maximize the amount of surface area upon which the candy is carried on the inner surface 20 of cone 12. This provides a candy handling surface area equivalent to that of a conventional conveyor belt extending in a substantially straight line which, to provide the same amount of surface area, would occupy much more floor space than the present invention.

For purposes of illustration, only a few turns of candy material in the cone 12 have been shown, but it can be appreciated by those skilled in the art that many more turns could be utilized if the cone was rotated at a faster pace, or if the feeder introduced the material into the cone 12 at a faster rate. It is conceivable that the spirals could totally run together should it so be desired so as to provide a continuous coverage on the entire inner surface of the cone, provided the adjustable arms 54 and kneading elements 56 were in such a number and properly positioned so as to generate the proper amount of kneading for tempering the candy to the desired consistency before it left the open bottom 16 of the cone.

In addition to adjusting the speed with which the candy material 28 may be fed into the cone 12, the speed of rotation of cone 12, and the shape of the inner surface 20 of the cone, the desired tempering can also be further controlled by adjusting the rate of cooling. The location, timing, amounts, and temperature of the fluids used in fluid spray cooling device 40 for spraying the outer surface 18 of the cone may be adjusted as desired. In addition, blower 46 can be utilized as required to further cool the candy material so that when it exits the open bottom 16 of the cone it is more viscous and approaching a plastic-like consistency as desired. The cooperation of the cooling elements can be monitored by the temperature sensor 36 which is connected to the feedback control mechanism 38. The feedback control mechanism 38 can then control via electronic signals (not shown) the parameters of the fluid coolant sprayed on the outer surface 18 of the cone, as well as the parameters of air utilized so as to maintain a constant temperature for the candy as may be required Since the kneading elements (plows and rollers) and the speed of rotation of the cone are adjustable, the present invention is easily adaptable for a wide range of candy formulations with differing properties. In addition, the present invention is able to accommodate a wide variety of candy formulations, while being compact and taking much less floor space than conventional belt coolers.

While the particular apparatus for tempering hard boiled candy as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

What is claimed is:

1. An apparatus for tempering a molten mass of hard boiled candy material, comprising:

an inverted truncated cone having an open top, and open bottom, an inner surface, and an outer surface, said inner surface having an upper rim portion;

rotating means coupled to said cone for rotating said cone about its longitudinal axis;

feed means for feeding said candy material onto said upper rim of said cone; and means associated with said cone for kneading said molten candy material as it moves from said upper rim down said inner surface of said rotating cone and out said open bottom, upon rotation of said cone, said means for kneading including a fixed stator coaxially positioned inside said cone, radially extending arms connected to said stator and rollers connected to said radially extending arms.

2. An apparatus for tempering a molten mass of hard boiled candy material, comprising:

(a) an inverted truncated cone having an open top, an open bottom, an inner surface and an outer surface, said inner surface having an upper rim portion;

(b) feed means for feeding said candy material onto said upper rim of said cone;

(c) advancing means associated with said cone for advancing said candy material from said upper rim down said inner surface of said cone and out said open bottom, said advancing means including rotating means coupled to said cone for rotating said cone about its longitudinal axis; and (d) radially extending arms connected to a fixed stator for kneading said molten candy material which passes over the molten candy material as it moves down said rotating cone wherein said radially extending arms are of adjustable length for accommodating different sizes of molten candy material masses in said cone.

3. The apparatus of claim 2, wherein said radially extending arms further comprise rollers.

4. The apparatus of claim 2, further comprising means for cooling said molten candy material as is moves down said inner surface of said cone.

5. The apparatus of claim 4, further comprising first cooling means positioned over said open top of said cone for blowing air onto said candy material carried into said cone.

6. The apparatus of claim 4, further comprising second cooling means for spraying a cooling fluid on the outside surface of said cone.

7. The apparatus of claim 2, further comprising control means for monitoring the temperature of said candy material and for controlling the operation of at least one cooling means.

8. The apparatus of claim 7, wherein said control means monitors the temperature of said candy mass as said candy mass exits said cone.

* * * * *